US012393148B2

(12) United States Patent
Yokoyama

(10) Patent No.: US 12,393,148 B2
(45) Date of Patent: Aug. 19, 2025

(54) IMAGE FORMING APPARATUS THAT DETECTS ATTACHED STATE TO MAIN BODY OF CASSETTE ACCOMMODATING SHEET

(71) Applicant: CANON KABUSHIKI KAISHA, Tokyo (JP)

(72) Inventor: Seiji Yokoyama, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/626,576

(22) Filed: Apr. 4, 2024

(65) Prior Publication Data

US 2024/0345523 A1 Oct. 17, 2024

(30) Foreign Application Priority Data

Apr. 11, 2023 (JP) ................................ 2023-064390

(51) Int. Cl.
*G03G 15/00* (2006.01)
*B65H 1/26* (2006.01)

(52) U.S. Cl.
CPC ......... *G03G 15/5062* (2013.01); *B65H 1/266* (2013.01); *G03G 15/6502* (2013.01); *G03G 15/6558* (2013.01); *B65H 2403/72* (2013.01)

(58) Field of Classification Search
CPC ........... G03G 15/5062; G03G 15/6502; G03G 15/6558; B65H 1/266; B65H 2403/72
See application file for complete search history.

(56) References Cited

U.S. PATENT DOCUMENTS

| | | | | |
|---|---|---|---|---|
| 9,975,717 | B2 * | 5/2018 | Fujinuma | B65H 1/04 |
| 10,294,053 | B2 * | 5/2019 | Kawamura | G03G 15/6511 |
| 2011/0233846 | A1 | 9/2011 | Miwa | |
| 2019/0389678 | A1 * | 12/2019 | Ota | B65H 1/08 |

FOREIGN PATENT DOCUMENTS

| | | | |
|---|---|---|---|
| JP | H05155445 | A | 6/1993 |
| JP | 2005096943 | A | 4/2005 |
| JP | 2010058954 | A | 3/2010 |
| JP | 2011195319 | A | 10/2011 |

* cited by examiner

*Primary Examiner* — Hoang X Ngo
(74) *Attorney, Agent, or Firm* — ROSSI, KIMMS & McDOWELL LLP

(57) ABSTRACT

An image forming apparatus includes: a detection unit configured to detect whether a cassette accommodating a sheet is in an attached state or in a non-attached state; a transfer roller configured to transfer an image to the sheet in a transfer region; a conveyance roller configured to convey, to the transfer region, a first sheet; a drive unit configured not to transmit the driving force to the conveyance roller in the non-attached state; and a determination unit configured to determine that an image defect has occurred when the detection unit detects that a state of the cassette has transitioned to the non-attached state, in a monitoring period including a period from a first timing at which the first sheet starts to be conveyed by the transfer roller, to a second timing.

11 Claims, 8 Drawing Sheets

IMAGE FORMING APPARATUS THAT DETECTS ATTACHED STATE TO MAIN BODY OF CASSETTE ACCOMMODATING SHEET

BACKGROUND OF THE INVENTION

Field of the Invention

The present invention relates to an image forming apparatus.

Description of the Related Art

Image forming apparatuses, in which a cassette that is accommodating sheets is configured to be attachable to and detachable from the main body of the apparatuses, are usually used. US-2011-0233846 discloses a configuration in which driving force to a conveyance roller that conveys sheets is disconnected when a cassette is removed from a main body of an apparatus.

Even if the driving of the conveyance roller is stopped when the cassette is removed during image formation, a transfer roller and the like located on a downstream side of the conveyance roller continue to be driven. Therefore, depending on the timing of removing the cassette, a situation may happen in which the transfer roller pulls out a sheet from the conveyance roller that is stopped. In such a case, a failure in transferring an image to the sheet, i.e., image defect of the image to be formed on the sheet may occur. Furthermore, the sheet may be directly discharged to the outside of the image forming apparatus and provided to the user.

SUMMARY OF THE INVENTION

According to a first aspect of the present invention, an image forming apparatus includes: a first detection unit configured to detect whether a cassette accommodating a sheet is in an attached state in which the cassette is attached to a main body of the image forming apparatus, or in a non-attached state in which the cassette is not attached to the main body; a transfer roller configured to transfer an image to the sheet in a transfer region; a conveyance roller configured to convey, to the transfer region, a first sheet that is fed from the cassette to a conveyance path; a drive unit configured to transmit a driving force of a motor to the conveyance roller in the attached state, and not to transmit the driving force of the motor to the conveyance roller in the non-attached state; and a determination unit configured to determine that an image defect has occurred in forming a first image on the first sheet when the first detection unit detects that a state of the cassette has transitioned from the attached state to the non-attached state, in a monitoring period including a period from a first timing at which the first sheet starts to be conveyed by the transfer roller, to a second timing.

Further features of the present invention will become apparent from the following description of exemplary embodiments with reference to the attached drawings.

DESCRIPTION OF THE EMBODIMENTS

Figure 1:
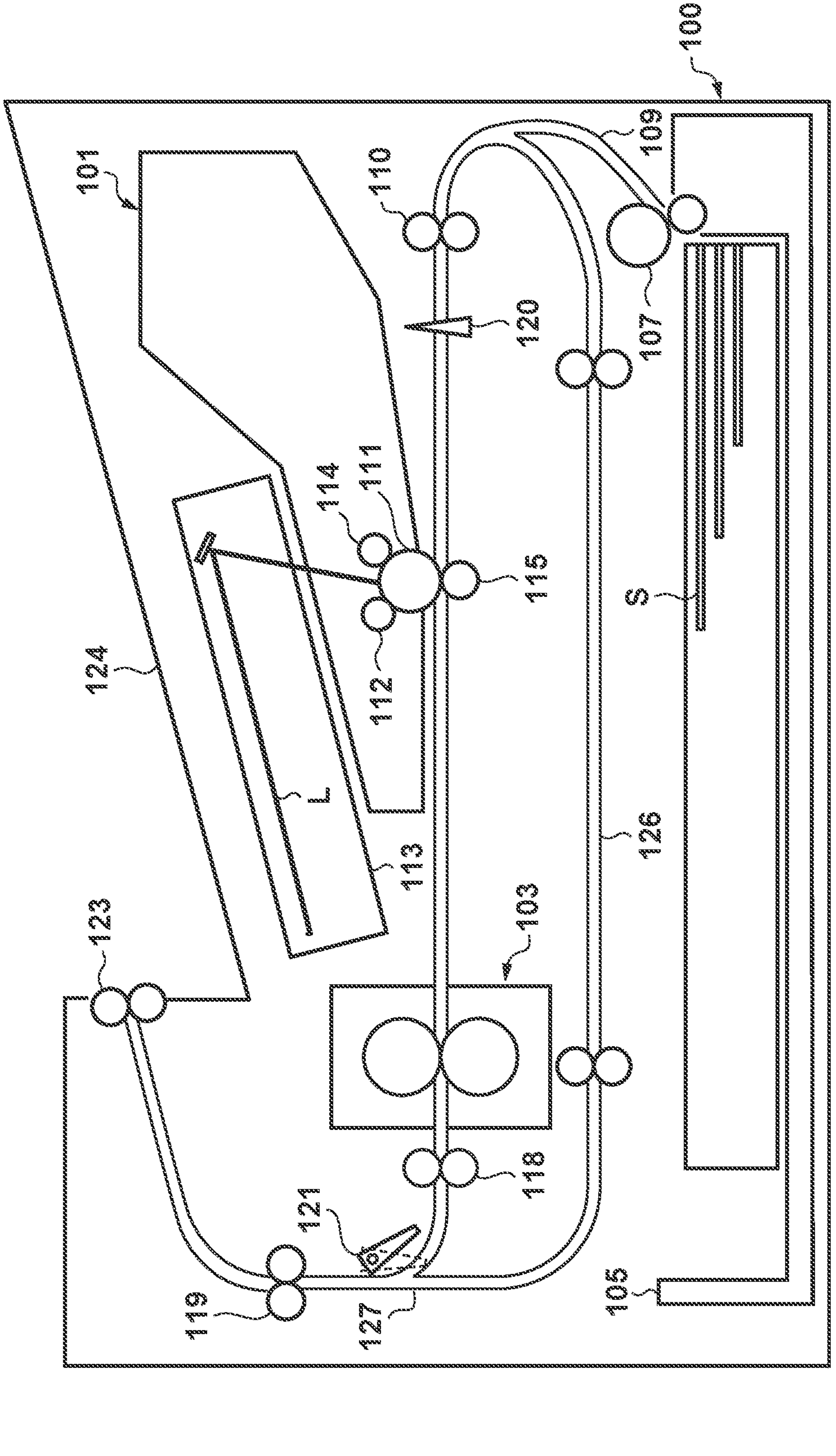
FIG. 1 is a configuration diagram of an image forming apparatus according to some embodiments.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a schematic configuration diagram of an image forming apparatus 100 according to the present embodiment. An image forming unit 101 includes a photoconductor 111 that is rotationally driven in a clockwise direction of the diagram in forming an image. A charge roller 112 charges, by a charging voltage, the surface of the photoconductor 111, which is rotationally driven, to a uniform potential. An exposure apparatus 113 exposes the charged photoconductor 111 with a light beam L to form an electrostatic latent image on the photoconductor 111. A developing apparatus 114 develops the electrostatic latent image on the photoconductor 111 with toner to form an image (toner image) on the photoconductor 111. A transfer roller 115 transfers the image on the photoconductor 111 to a sheet S by a transfer voltage. In the following description, a region where the transfer roller 115 transfers the image on the photoconductor 111 to the sheet S is referred to as a transfer region.

A feed roller 107 feeds the sheet S accommodated in a cassette 105 to a conveyance path 109. A registration roller 110 feeds the sheet S into the transfer region. The registration roller 110 is a conveyance roller that conveys the sheet S. A registration sensor 120 detects whether or not the sheet S exists at a detection position in the conveyance path 109. The detection position is at the upstream side from the transfer region in the conveyance direction of the sheet S in the conveyance path 109. Based on a timing at which the registration sensor 120 detects a leading edge of the sheet S, the timing at which the registration roller 110 feeds the sheet S into the transfer region is adjusted.

A fixing unit 103 pressurizes and heats the sheet S, on which an image is transferred by the transfer roller 115, to fix the image to the sheet S. A conveyance roller 118 conveys the sheet S, on which the image is fixed, to a downstream side in the conveyance direction. When forming an image only on one side of the sheet S, the sheet S is discharged to a tray 124 by a reverse roller 119 and a discharge roller 123. When forming images on both sides of the sheet S, a flapper 121 is set into a state indicated by the dashed lines in the drawing after the trailing edge of the sheet S has passed a branch point 127, and then reverses the rotation direction of the reverse roller 119 from the rotation direction before that. And thus, the sheet S is conveyed to the transfer region again via a double-sided conveyance path 126, and the image formation is performed on the other side of the sheet S.

Figure 2A:
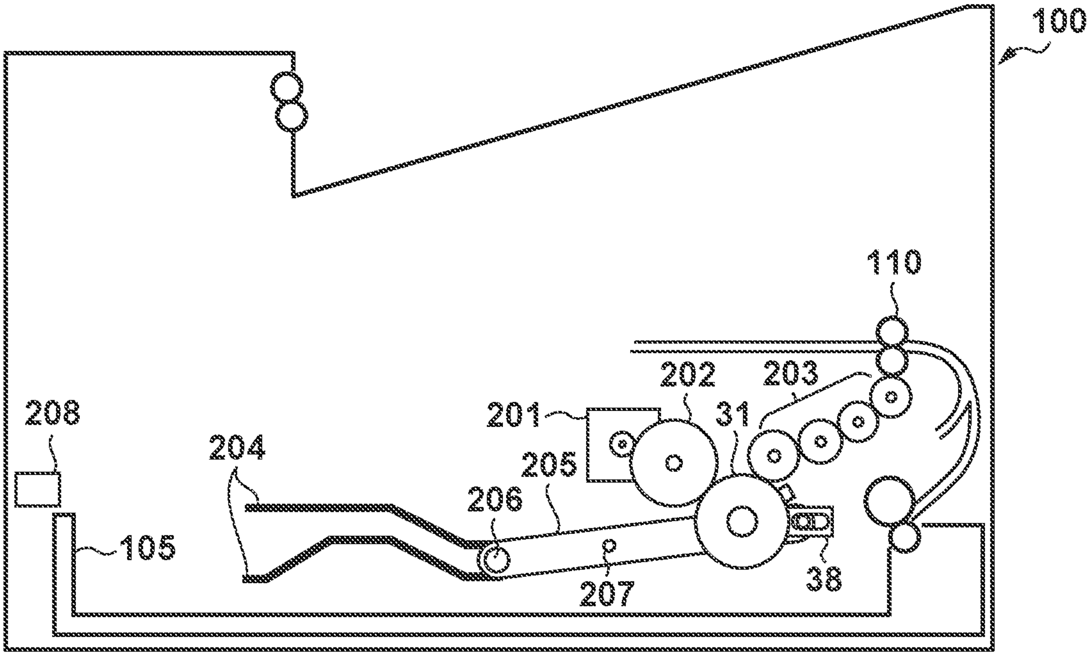
FIG. 2A and FIG. 2B are explanatory diagrams of a transmission configuration of driving force to a registration roller, according to some embodiments.
Figure 2B:
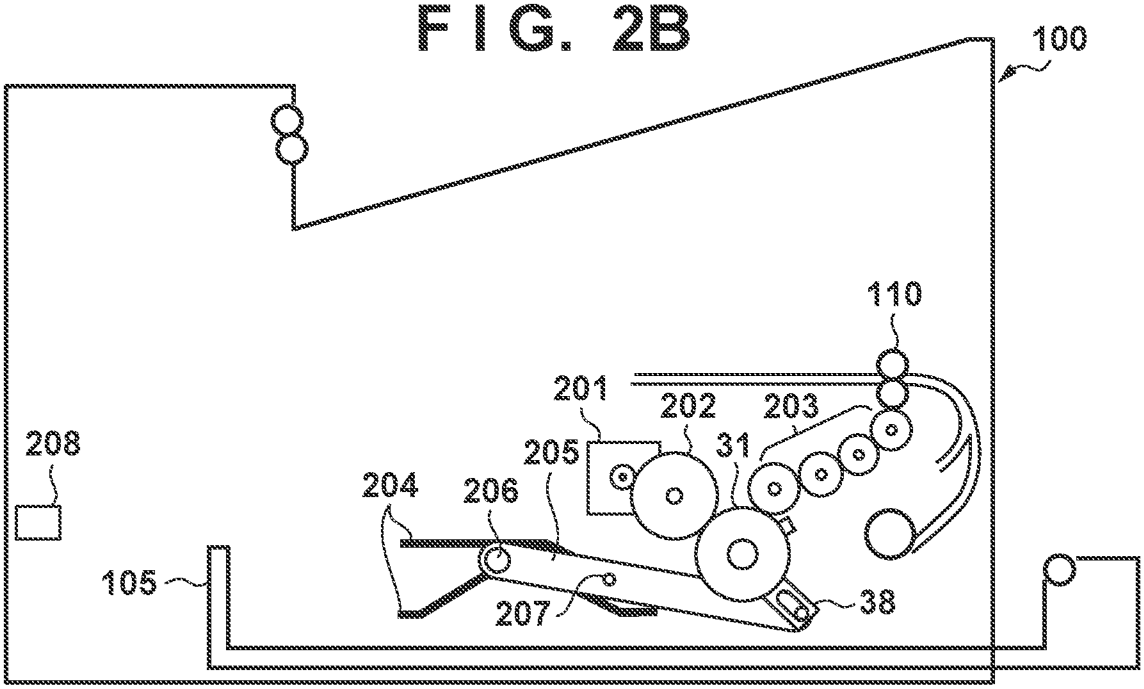

FIG. 2A and FIG. 2B are explanatory diagrams of a configuration of the cassette 105. In FIG. 2A, a state is illustrated in which the cassette 105 is attached to the main body of the image forming apparatus 100. This state will be referred to as an attached state in the following. In FIG. 2B, a state is illustrated in which the cassette 105 is pulled out from the main body of the image forming apparatus 100. This will be referred to as a non-attached state. An input gear 202 transmits the driving force of a motor 201 to a drive clutch 31. The drive clutch 31 is a mechanical clutch, which is set to either a transmission state in which the driving force of the motor 201 is transmitted to a gear group 203 or a disconnected state in which the driving force of the motor 201 is not transmitted to the gear group 203. The state of the drive clutch 31 is configured to be in conjunction with the state of the cassette 105, as will be described below. When the drive clutch 31 is in the transmission state, the gear group 203 transmits the driving force from the motor 201 to the registration roller 110.

Slide guides 204 are provided on an outer side surface of the cassette 105. A slide boss 206 of a switching member 205 is nipped between the slide guides 204. When the slide guide 204 moves rightward by moving the cassette 105 rightward in the drawing from the attached state illustrated in FIG. 2A, the slide boss 206 moves upward in the drawing in accordance with the shape of the slide guides 204. Accordingly, the switching member 205 pivots about a fulcrum 207. A lever member 38 changes the state of the drive clutch 31 in conjunction with the pivoting of the switching member 205. In the present embodiment, the drive clutch 31 is configured such that the drive clutch 31 turns into the transmission state when the cassette 105 is in the attached state, and the drive clutch 31 turns into the disconnected state when the cassette 105 is in the non-attached state. A cassette sensor 208 detects whether or not the cassette 105 is in the attached state.

Figure 3A:
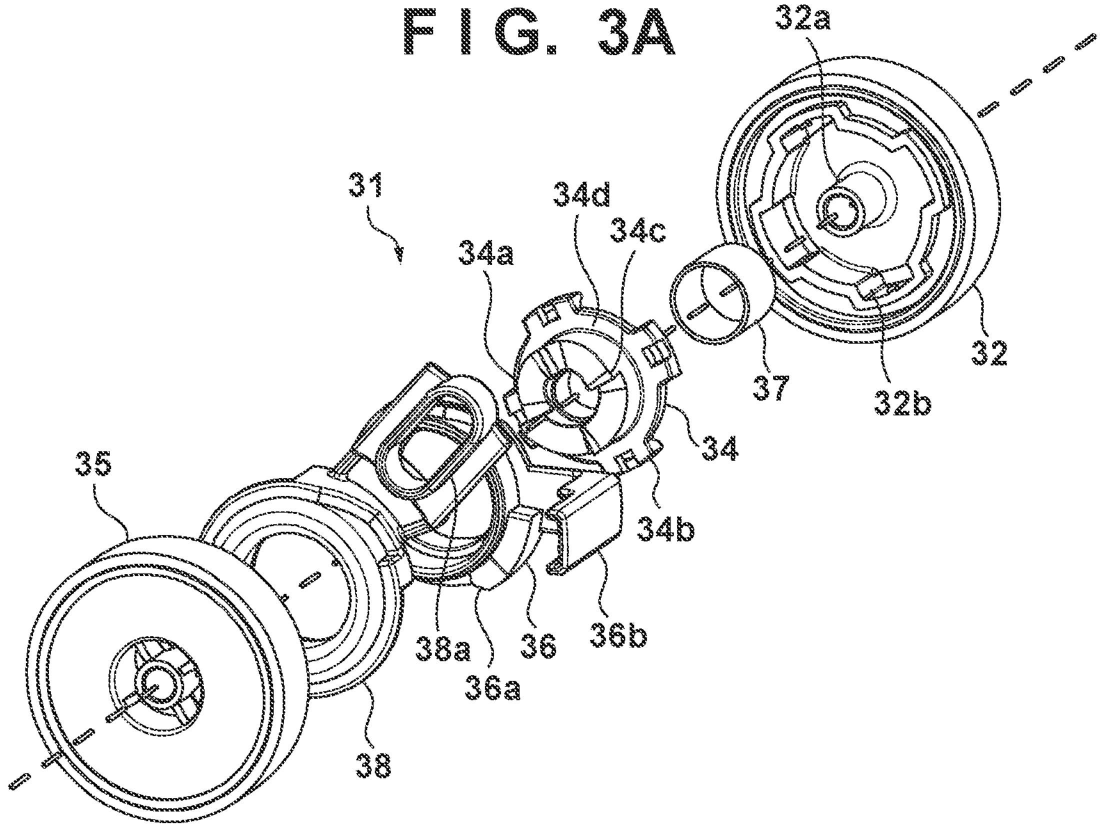
FIG. 3A and FIG. 3B are perspective diagrams of a drive clutch, according to some embodiments.
Figure 3B:
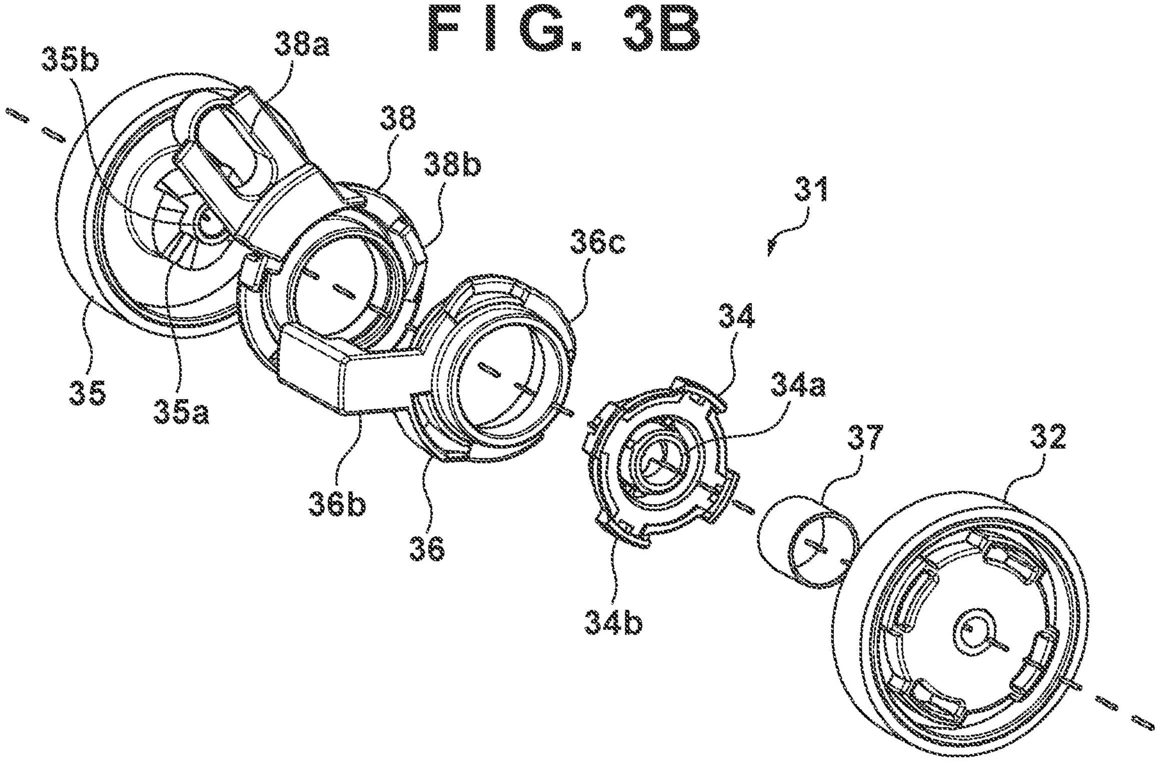

FIG. 3A and FIG. 3B are perspective diagrams of the drive clutch 31. A clutch input gear 32 is rotatably supported by a fixed supporting shaft (not illustrated). The driving force from the input gear 202 is transmitted to the clutch input gear 32. The inner periphery of a sliding boss 32*a* near the center of the clutch input gear 32 serves as a sliding surface with respect to the supporting shaft, and the outer periphery serves as a sliding surface with respect to an engagement member 34. Four rotation stoppers 32*b* are provided inside the clutch input gear 32 closer at the vicinity of the outer periphery of the clutch input gear 32, as rotation stoppers for the engagement member 34.

The inner peripheral surface 34*a* of the engagement member 34 is supported to be slidable with respect to the outer peripheral surface of the sliding boss 32*a* of the clutch input gear 32. In addition, the engagement member 34 rotates together with the clutch input gear 32 by the rotation stopper 34*b* of the engagement member 34 meshing with the rotation stopper 32*b* of the clutch input gear 32. A protrusion 34*c* is provided at four positions in the engagement member 34. When the protrusion 34*c* meshes with a protrusion 35*a* of the clutch output gear 35, the drive clutch 31 turns into the transmission state. A sliding portion 34*d* that rotationally slides with a release member 36 is provided on the engagement member 34 at an edge surface facing the clutch output gear 35 side. The engagement member 34 is always biased toward the protrusion 35*a* of the clutch output gear 35 by a coil spring 37 serving as an elastic member.

The clutch output gear 35 is rotatably supported by a supporting shaft (not illustrated) at an inner peripheral surface 35*b*. In the driving state, the clutch output gear 35 transmits the driving force from the clutch input gear 32 to the gear group 203. The lever member 38 is rotatably supported with respect to the clutch output gear 35. A cam portion 38*b* of the lever member 38 abuts a cam portion 36*a* of the release member 36 to control the position in the supporting shaft direction. A lever portion 38*a* of the lever member 38 is connected to the switching member 205. A rotation restriction unit 36*b* of the release member 36 is engaged with a fixing member (not illustrated) to restrict rotation thereof. A sliding portion 36*c* of the release member 36 abuts the sliding portion 34*d* of the engagement member 34.

Figure 4A:
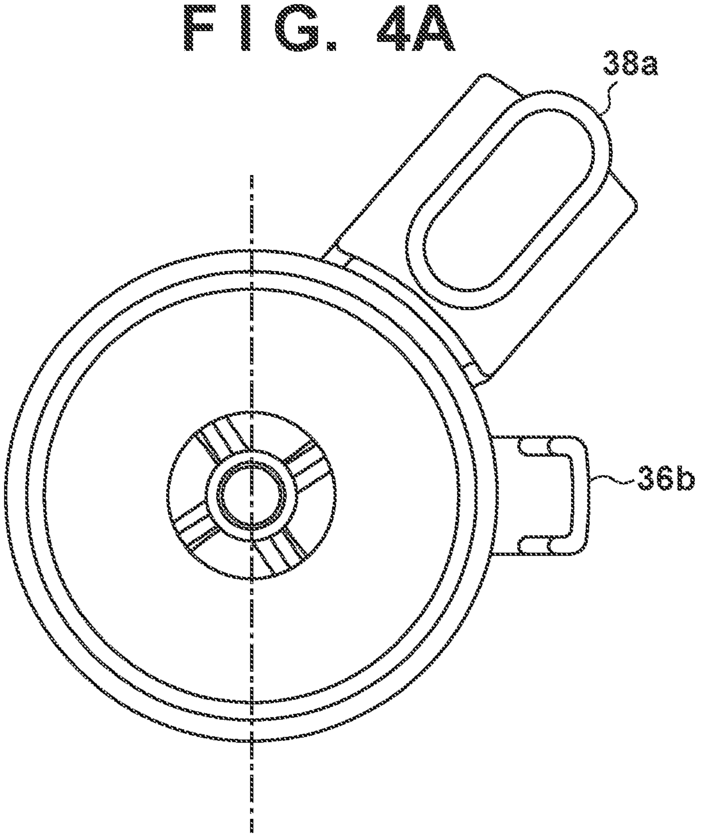
FIG. 4A is a diagram illustrating a drive clutch in a driving state, according to some embodiments.

The drive clutch 31 is configured to be in a state in which, for example, a concave-up portion of the cam portion 38*b* of the lever member 38 and a concave-down portion of the cam portion 36*a* of the release member 36 match with each other when the lever portion 38*a* and the rotation restriction unit 36*b* are in a positional relation as illustrated in FIG. 4A. In this case, the release member 36 moves toward the clutch output gear 35, and the engagement member 34 is pressed by the elastic force of the coil spring 37 to mesh with the clutch output gear 35. And thus, the drive clutch 31 turns into the transmission state.

Figure 4B:
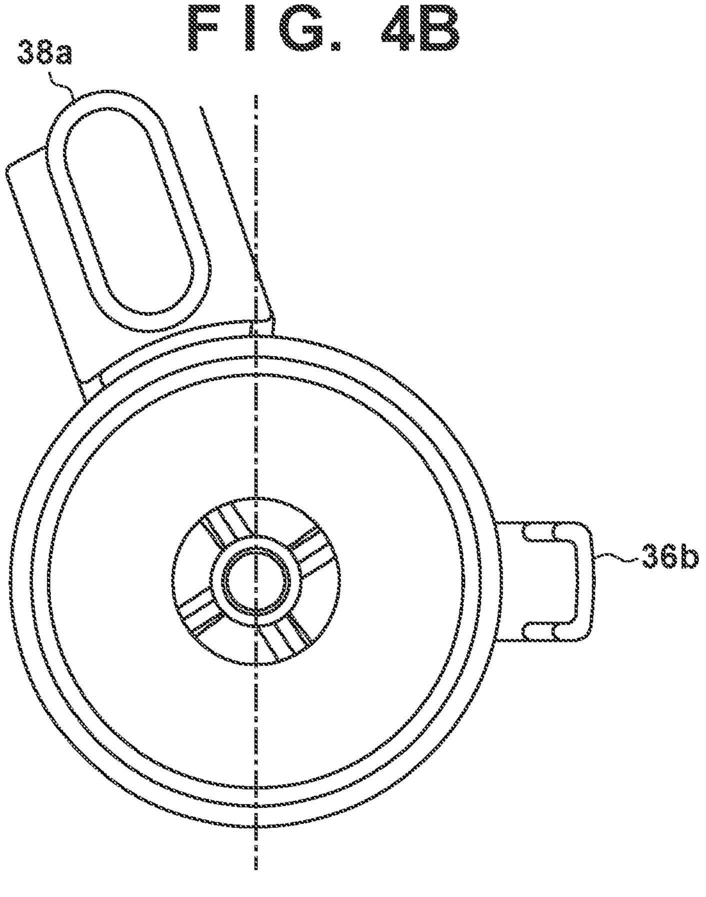
FIG. 4B is a diagram illustrating a drive clutch in a disconnected state, according to some embodiments.

On the other hand, the drive clutch 31 is configured to be in a state in which the concave-up portion of the cam portion 38*b* of the lever member 38 and a concave-up portion of the cam portion 36*a* of the release member 36 match with each other when the lever portion 38*a* and the rotation restriction unit 36*b* are in a positional relation as illustrated in FIG. 4B. In this case, the release member 36 is pushed out toward the clutch input gear 32, and the sliding portion 36*c* abuts the sliding portion 34*d* of the engagement member 34. And thus, the engagement member 34 is separated from the clutch output gear 35 against the biasing force of the coil spring 37. Therefore, transmission of the driving force to the clutch output gear 35 is disconnected and the drive clutch 31 turns into the disconnected state.

Figure 5:
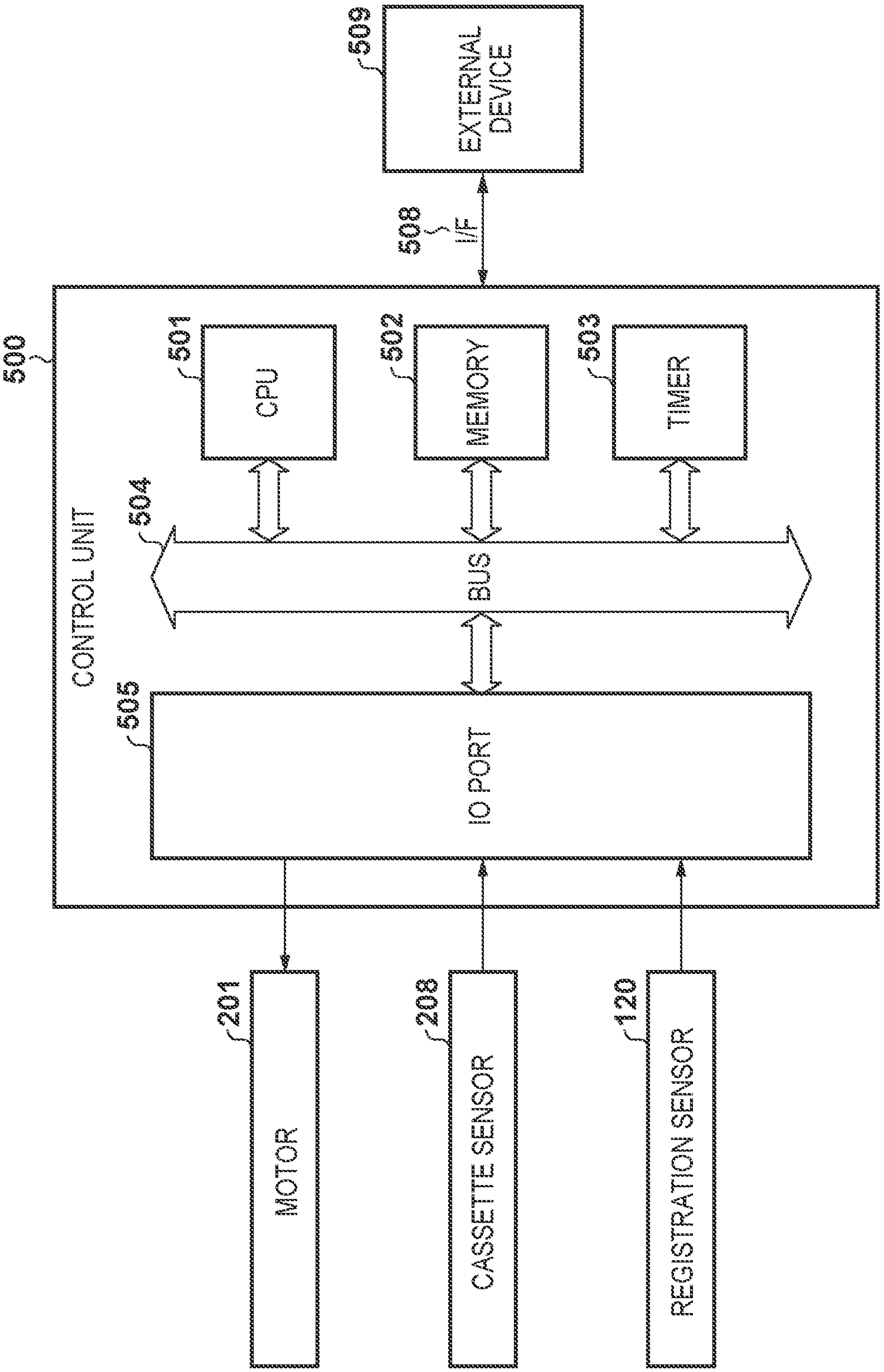
FIG. 5 is a control configuration diagram of the image forming apparatus, according to some embodiments.

FIG. 5 is a control configuration diagram of the image forming apparatus 100. A control unit 500 controls the entire image forming apparatus 100. The control unit 500 includes a Central Processing Unit (CPU) 501, a memory 502, a timer 503, and an Input/Output (IO) port 505. The CPU 501, the memory 502, the timer 503 and the IO port 505 are connected to each other via a bus 504. The CPU 501 controls the image forming apparatus 100 by executing a program stored in the memory 502. The memory 502 is a collective term for both a non-volatile memory and a volatile memory. The timer 503 measures time. The CPU 501 controls each member illustrated in FIG. 1 via the IO port 505. In addition, the control unit 500 is connected to an external device 509 such as a personal computer or a mobile information-processing equipment via an external interface (I/F) 508.

The external device 509 instructs image formation or the like to the image forming apparatus 100.

Figure 6:
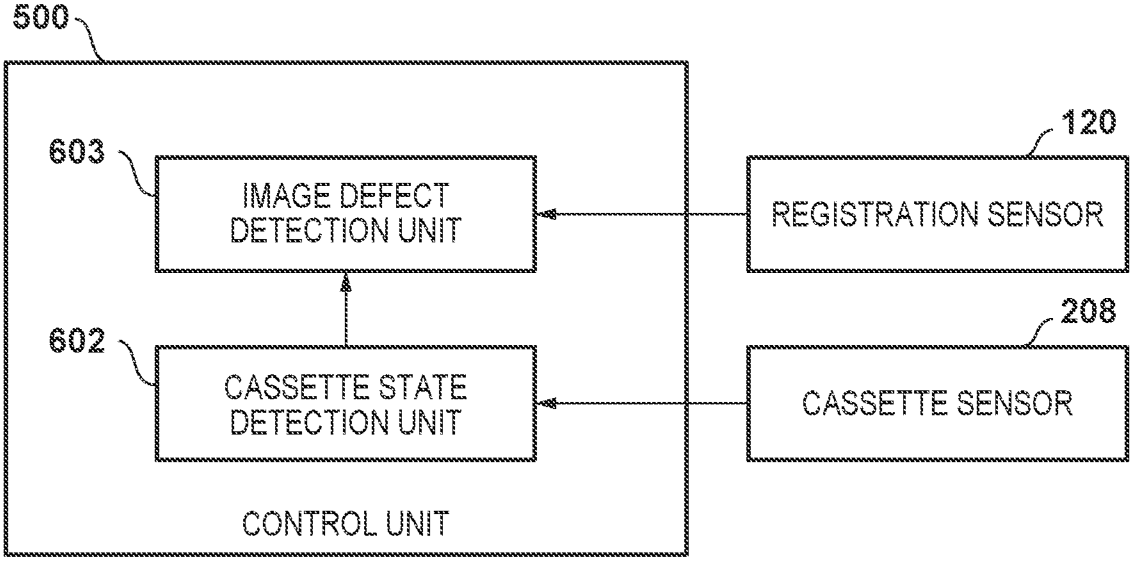
FIG. 6 is a functional block diagram of a control unit, according to some embodiments.

FIG. 6 is a functional block diagram of the control unit 500 according to the present embodiment. The functional blocks illustrated in FIG. 6 can be realized by the CPU 501 executing a program stored in the memory 502. A cassette state detection unit 602 detects whether the cassette 105 is in the attached state or the non-attached state, based on the result of detection by the cassette sensor 208. The cassette state detection unit 602 notifies the state of the cassette 105 to an image defect detection unit 603. The image defect detection unit 603 detects and determines whether or not an image defect caused by removing the cassette 105 has occurred, based on the result of detection by the registration sensor 120 and the detection result from the cassette state detection unit 602.

Figure 7:
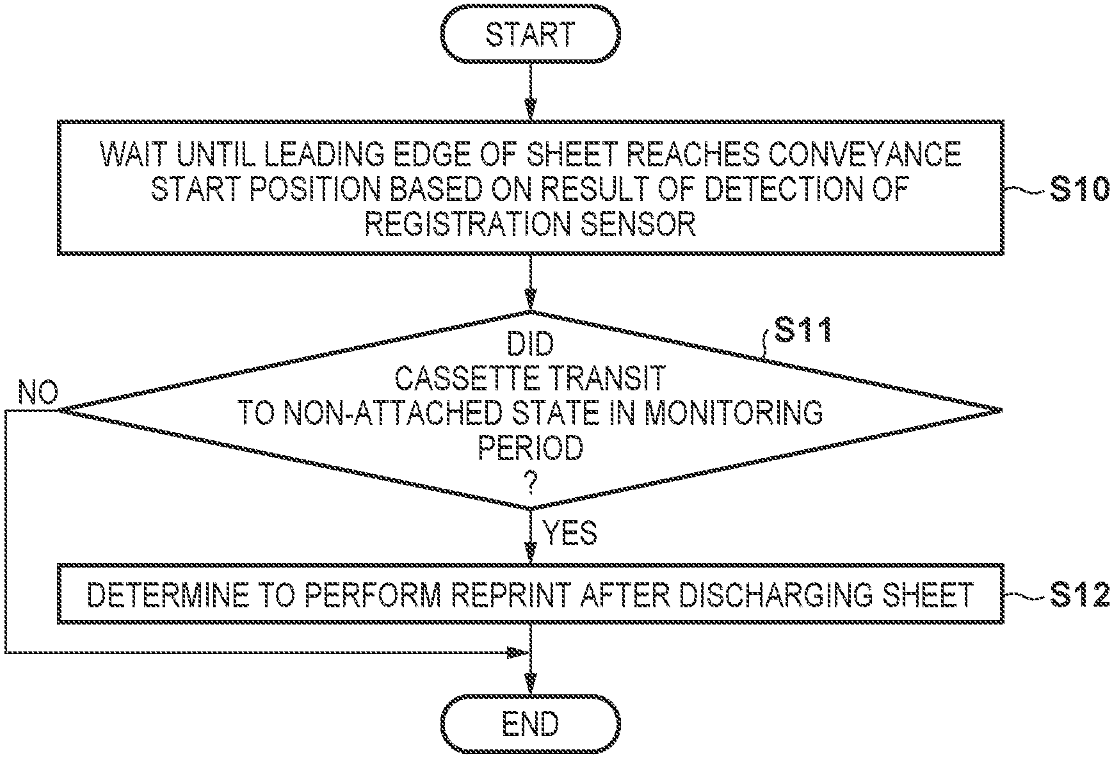
FIG. 7 is a flowchart of processing executed by the control unit, according to some embodiments.

FIG. 7 is a flowchart of processing executed by the image defect detection unit 603, according to the present embodiment. The image defect detection unit 603 executes the processing illustrated in FIG. 7 for each sheet S that is image forming target. When a signal indicating detection of the leading edge of the sheet S is received from the registration sensor 120, the image defect detection unit 603 determines, at S10, an arrival timing at which the leading edge of the sheet S reaches the position of the transfer roller 115, more specifically, a conveyance start position of conveying the sheet S by the transfer roller 115. The arrival timing may be determined based on the conveyance distance of the sheet S from the detection position by the registration sensor 120 to the conveyance start position, and the conveyance speed of the sheet S. The image defect detection unit 603 waits until the leading edge of the sheet S reaches the conveyance start position, i.e., until the arrival timing.

The image defect detection unit 603 monitors, from when the arrival timing is reached at S11, at least until the timing when the trailing edge of the sheet S passes through the registration roller 110, whether or not the state of the cassette 105 has transitioned to the non-attached state. In the following description, a period from the arrival timing to a timing at which the trailing edge of the sheet S passes through the registration roller 110 will be denoted as a monitoring period. The monitoring period is a period in which the sheet S is conveyed by both the transfer roller 115 and the registration roller 110. A value M of the monitoring period is given by $M=(L-D)/Sp$, where L is the length of the sheet S in the conveyance direction, D is the conveyance distance from the registration roller 110 to the conveyance start position, and Sp is the conveyance speed of the sheet S. When M takes a negative value, M is set to $M=0$.

When the state of the cassette 105 has not transitioned to the non-attached state in the monitoring period, the image defect detection unit 603 determines that image defect has not occurred, and terminates the processing of FIG. 7. When, on the other hand, the state of the cassette 105 has transitioned to the non-attached state in the monitoring period, the image defect detection unit 603 determines that an image defect has occurred. This is because the transmission of the driving force to the registration roller 110 is disconnected by the cassette 105 turning into the non-attached state, whereby the sheet S turns into a state in which the sheet S is pulled by the transfer roller 115 from the registration roller 110 that has stopped the rotation. Upon determining that an image defect has occurred, the image defect detection unit 603 determines to discharge the sheet S to the tray 124 at S12 and subsequently form the image, which has been formed on the sheet S, again on a next sheet S. In such a case, the image defect detection unit 603 sets, for example, a reprint flag indicating to perform reprinting. When the reprint flag is set, the control unit 500 performs a reprint operation of the image determined to have image defect, after the cassette 105 has turned into the attached state. In FIG. 7, the monitoring period is a period in which the sheet S is conveyed by both the transfer roller 115 and the registration roller 110. However, the monitoring period may be a period including at least a period in which the sheet S is conveyed by both the transfer roller 115 and the registration roller 110.

According to the present embodiment as has been described above, whether or not the cassette 105 has transitioned to the non-attached state is monitored in a monitoring period including the period in which the sheet S is conveyed by both the transfer roller 115 and the registration roller 110. When the cassette 105 turns into the non-attached state in the monitoring period, an image defect caused by a change of the state of the cassette 105 may occur, as has been described above. Therefore, when the cassette 105 turns into the non-attached state in the monitoring period, it is determined that an image defect has occurred, and a reprint operation is performed. When, on the other hand, the cassette 105 has not transitioned to the non-attached state in the monitoring period or the cassette 105 has transitioned to the non-attached state during the image formation but not in the monitoring period, it is determined that the image defect caused by the change of state of the cassette 105 has not occurred. According to the present configuration, whether or not an image defect has occurred on the sheet can be appropriately determined even when the cassette is removed during image formation on a sheet.

Second Embodiment

Figure 8:
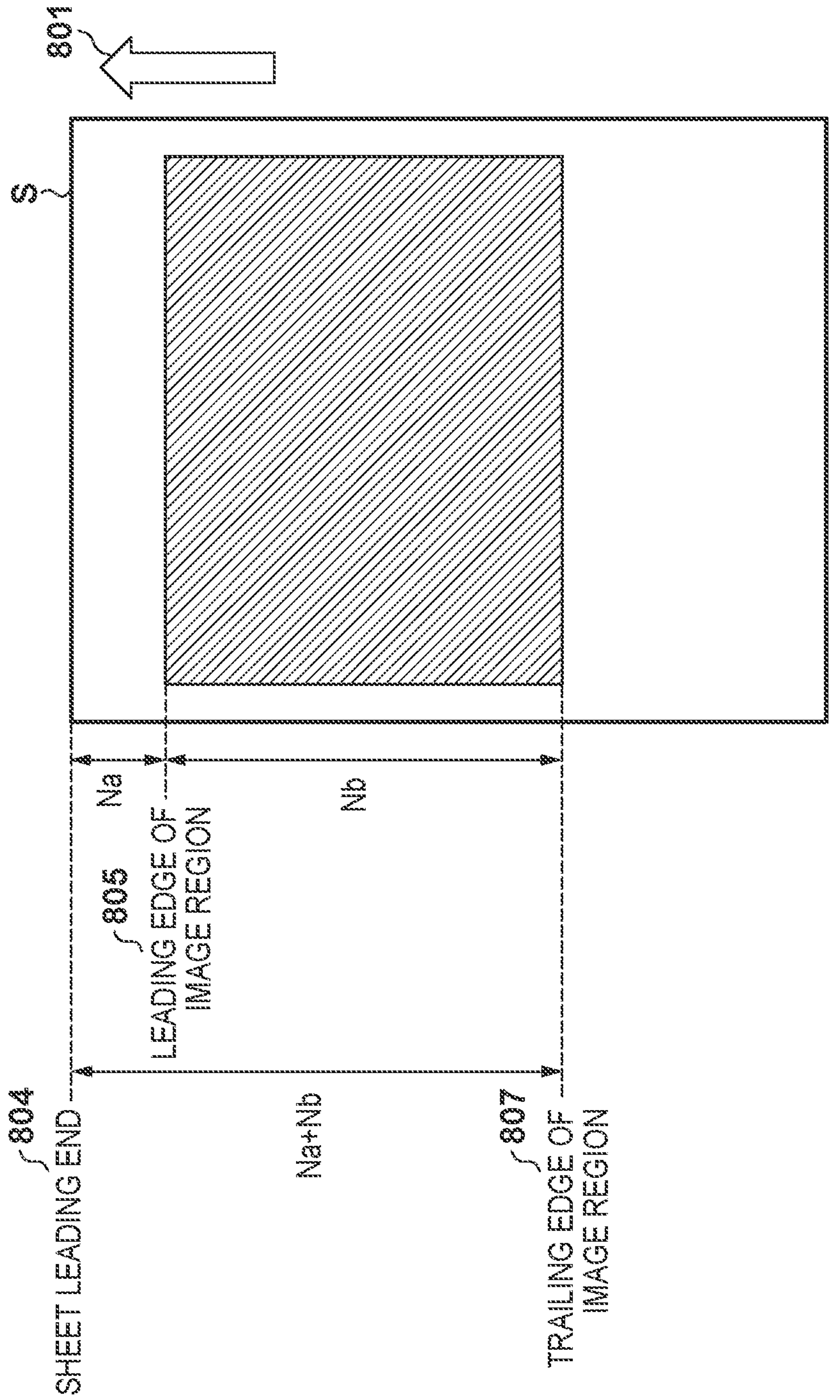
FIG. 8 is an explanatory diagram of a monitoring period, according to some embodiments.

Next, a second embodiment will be explained mainly on differences from the first embodiment. As illustrated in FIG. 8, in general, an image is not formed over the entire region of the sheet S, and margins are provided in the leading edge side and the trailing edge side in the conveyance direction 801 of the sheet S. The shading region in FIG. 8 is a region (image forming region) of the sheet S on which an image is formed. In FIG. 8, a margin of a length Na is provided between a leading edge 804 of the sheet S and a leading edge 805 of the image forming region. The length of the image forming region in the conveying direction, i.e., the length between the leading edge 805 and the trailing edge 807 of the image forming region is Nb.

In the first embodiment, the monitoring period is a period in which the sheet S is conveyed by both the transfer roller 115 and the registration roller 110, or a period including this period. However, when the trailing edge 807 of the image forming region of the sheet S has passed through the transfer region, the image transferred to the sheet S is not affected even when driving of the registration roller 110 is stopped. Therefore, the monitoring period in the present embodiment may be a period from when the sheet S starts to be conveyed by the transfer roller 115 to when the trailing edge 807 of the image forming region passes through the transfer region.

The flowchart of the processing executed by the image defect detection unit 603 in the present embodiment is similar to that of FIG. 7. Unlike the first embodiment, however, the monitoring period in the present embodiment is a period from when the leading edge 804 of the sheet S reaches the conveyance start position to when the trailing edge 807 of the image forming region passes through the transfer region. In other words, the monitoring period in the present embodiment is a period from the arrival timing to the timing at which transfer of the image to the sheet S is completed. When, for example, the length from the leading edge 804 of the sheet S to the trailing edge 807 of the image forming region is Na+Nb, as illustrated in FIG. 8, the value M of the monitoring period is calculated as M=(Na+Nb)/Sp. Here, the difference between the position at the most downstream side of the transfer region in the conveyance direction and the conveyance start position is small, and therefore in the aforementioned equation, the position at the most downstream side of the transfer region in the conveyance direction is approximated as the conveyance start position. Here, in the present embodiment, the monitoring period may be set to a period including at least a period from when the leading edge 804 of the sheet S reaches the conveyance start position to when the trailing edge 807 of the image forming region passes through the transfer region.

According to the present embodiment as has been described above, whether or not the cassette 105 has transitioned to the non-attached state is monitored in the monitoring period including at least a period from when conveyance of the sheet S by the transfer roller 115 starts to when transfer of an image to the sheet S is completed. When the cassette 105 turns into the non-attached state in the monitoring period, an image defect caused by the state change of the cassette 105 may occur. Therefore, when the cassette 105 turns into the non-attached state in the monitoring period, it is determined that an image defect has occurred, and a reprint operation is performed. When, on the other hand, the cassette 105 has not transitioned to the non-attached state in the monitoring period or the cassette 105 has transitioned to the non-attached state during the image formation but not in the monitoring period, it is determined that the image defect caused by the change of state of the cassette 105 has not occurred. The present configuration allows for appropriately determining whether or not an image defect has occurred on the sheet even when the cassette is removed during image formation on a sheet.

Third Embodiment

Next, a third embodiment will be described focusing on differences from the first and second embodiments. In the first and second embodiments, the image defect detection unit 603 determines the monitoring period, i.e., the arrival timing, the timing at which the trailing edge of the sheet S passes through the registration roller 110, and the timing when the trailing edge 807 of the image forming region passes through the transfer region, based on the result of detection by the registration sensor 120 and the conveyance speed of the sheet S. In the present embodiment, a rotation amount of the registration roller 110 is used instead of the conveyance speed of the sheet S.

Figure 9:
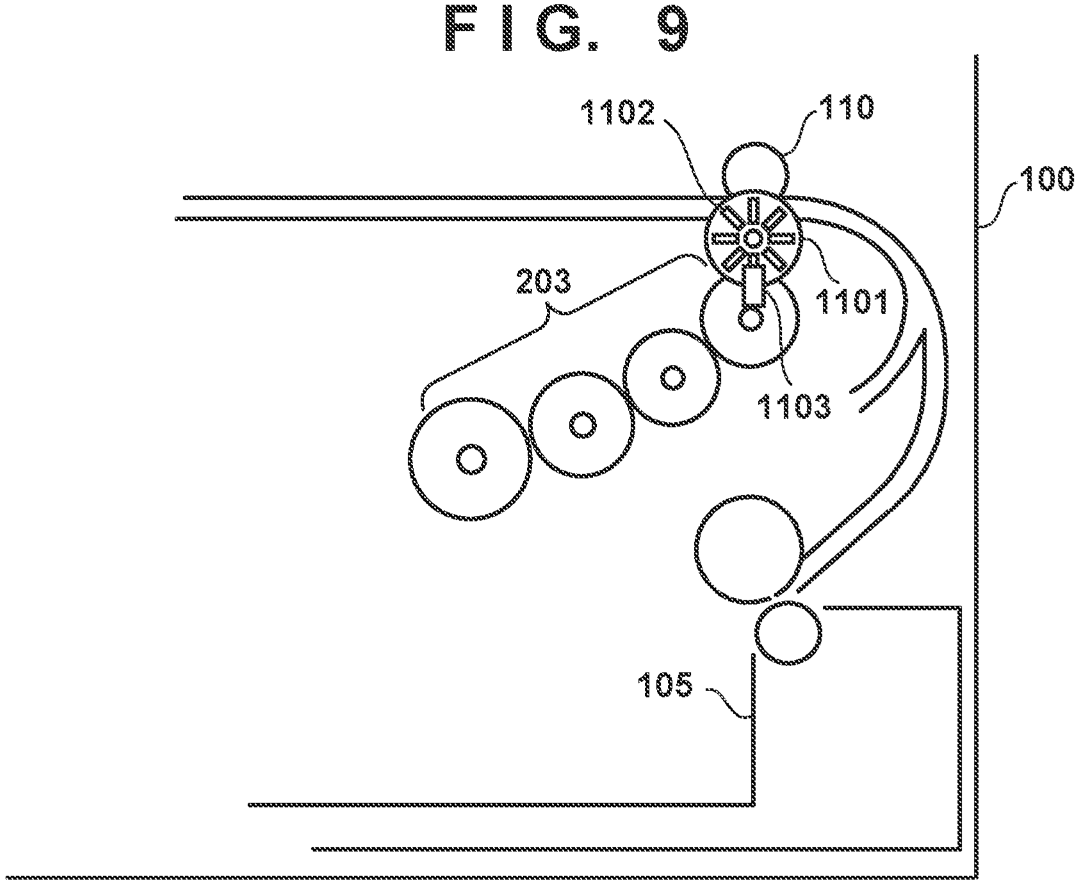
FIG. 9 is a diagram illustrating a detection configuration for a rotation amount of a registration roller, according to some embodiments.
Figure 10:
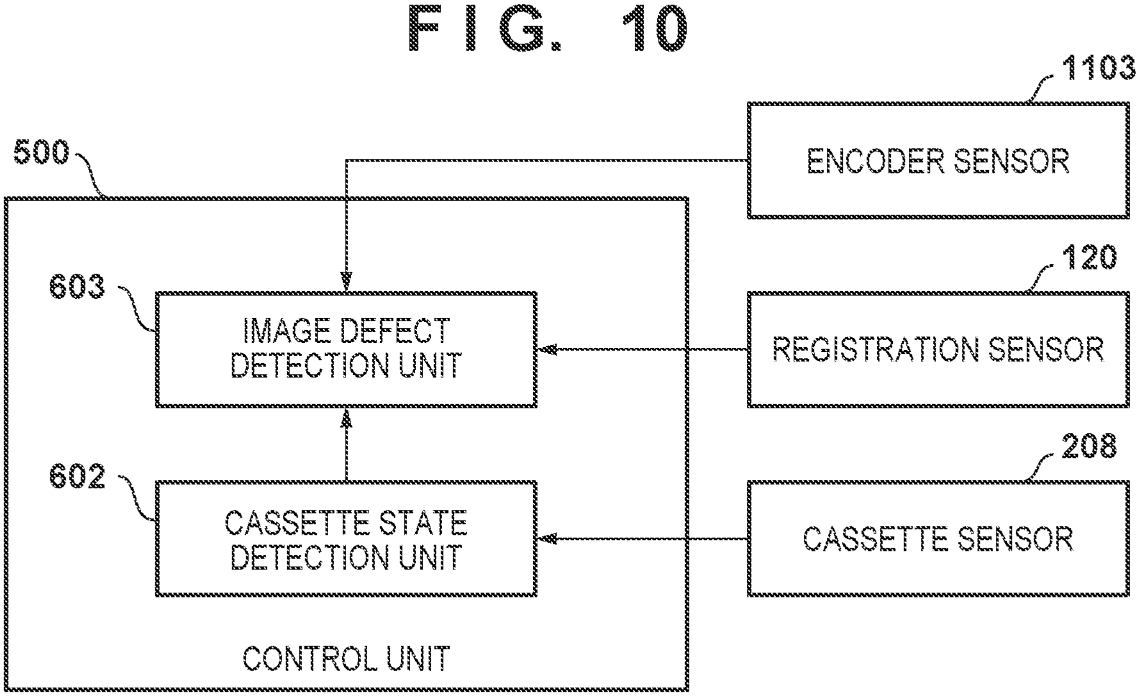
FIG. 10 is a functional block diagram of the control unit, according to some embodiments.

FIG. 9 is a configuration diagram of the vicinity of the registration roller 110. An encoder 1101 is rotationally driven together with the registration roller 110. A plurality of slits 1102 are provided in the encoder 1101. An encoder sensor 1103 detects each of the slits 1102 in the encoder 1101. As illustrated in FIG. 10, the encoder sensor 1103 notifies the image defect detection unit 603 of a detection signal indicating whether or not each of the slits 1102 of the encoder 1101 is detected.

The image defect detection unit 603 determines the rotation amount of the registration roller 110, based on the detection signal from the encoder sensor 1103. Furthermore, the image defect detection unit 603 determines the conveyance distance (conveyance amount) of the sheet S, based on the rotation amount of the registration roller 110. The relation between the rotation amount of the registration roller 110 and the conveyance amount of the sheet S is preliminarily set in the image defect detection unit 603. The image defect detection unit 603 determines the arrival timing, the timing at which the trailing edge of the sheet S passes through the registration roller 110, and the timing at which the trailing edge 807 of the image forming region passes through the transfer region, based on the conveyance distance of the sheet S.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-064390, filed Apr. 11, 2023, which is hereby incorporated by reference herein in its entirety.

What is claimed is:

1. An image forming apparatus comprising:

a first detection unit configured to detect whether a cassette accommodating a sheet is in an attached state in which the cassette is attached to a main body of the image forming apparatus, or in a non-attached state in which the cassette is not attached to the main body;

a transfer roller configured to transfer an image to the sheet in a transfer region;

a conveyance roller configured to convey, to the transfer region, a first sheet that is fed from the cassette to a conveyance path;

a drive unit configured to transmit a driving force of a motor to the conveyance roller in the attached state, and not to transmit the driving force of the motor to the conveyance roller in the non-attached state; and a determination unit configured to determine that an image defect has occurred in forming a first image on the first sheet when the first detection unit detects that a state of the cassette has transitioned from the attached state to the non-attached state, in a monitoring period including a period from a first timing at which the first sheet starts to be conveyed by the transfer roller, to a second timing.

2. The image forming apparatus according to claim 1, further comprising a second detection unit configured to detect whether or not the sheet exists at a detection position on an upstream side from the transfer region in a conveyance direction of the sheet, wherein the determination unit determines the first timing and the second timing, based on a timing at which the second detection unit detects the first sheet.

3. The image forming apparatus according to claim 2, wherein the determination unit determines the first timing and the second timing, based on a timing at which the second detection unit detects a leading edge of the first sheet, and a conveyance speed of the first sheet.

4. The image forming apparatus according to claim 2 further comprising a third detection unit configured to detect a rotation amount of the conveyance roller, wherein the determination unit determines the first timing and the second timing, based on a timing at which the second detection unit detects a leading edge of the first sheet, and a conveyance amount of the first sheet determined based on the rotation amount of the conveyance roller.

5. The image forming apparatus according to claim 1, wherein the monitoring period includes a period in which the first sheet is conveyed by both the transfer roller and the conveyance roller.

6. The image forming apparatus according to claim 1, wherein the monitoring period includes a period in which the first image is transferred to the first sheet by the transfer roller.

7. The image forming apparatus according to claim 1, wherein the second timing is a timing at which a trailing edge of the first sheet in the conveyance direction of the sheet passed through the conveyance roller.

8. The image forming apparatus according to claim 1, wherein the second timing is a timing at which transfer of the first image to the first sheet is completed.

9. The image forming apparatus according to claim 1, wherein the second timing is a timing at which a trailing edge of an image forming region in the conveyance direction of the sheet passes through the transfer region, the image forming region is a region in which the first image is formed on the first sheet.

10. The image forming apparatus according to claim 1, further comprising a control unit configured to perform control, when the determination unit has determined that the image defect has occurred in forming the first image on the first sheet, to form the first image on the sheet accommodated in the cassette after the cassette transitions from the non-attached state to the attached state.

11. The image forming apparatus according to claim 1, wherein the drive unit includes a mechanical clutch that operates in conjunction with the state of the cassette.

* * * * *